(12) United States Patent
Kim et al.

(10) Patent No.: US 9,405,170 B2
(45) Date of Patent: Aug. 2, 2016

(54) METHOD AND APPARATUS FOR CONTINUOUS AUTO FOCUSING OF A CAMERA IN A MOBILE TERMINAL

(75) Inventors: Nam Jin Kim, Suwon-si (KR); Hyun Ho Seo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 873 days.

(21) Appl. No.: 13/094,226

(22) Filed: Apr. 26, 2011

(65) Prior Publication Data

US 2012/0121241 A1    May 17, 2012

(30) Foreign Application Priority Data

Nov. 11, 2010    (KR) .................... 10-2010-0112183

(51) Int. Cl.
| | | |
|---|---|---|
| *G03B 3/10* | (2006.01) | |
| *G03B 13/36* | (2006.01) | |
| *G03B 17/20* | (2006.01) | |
| *H04N 5/232* | (2006.01) | |
| *G02B 7/36* | (2006.01) | |

(52) U.S. Cl.
CPC ........ *G03B 13/36* (2013.01); *G02B 7/36* (2013.01); *G03B 17/20* (2013.01); *H04N 5/23212* (2013.01); *H04N 5/23293* (2013.01)

(58) Field of Classification Search
USPC ............ 396/95, 103, 121, 123–125; 348/345, 348/352
See application file for complete search history.

(56) References Cited

U.S. PATENT DOCUMENTS

| | | |
|---|---|---|
| 5,473,369 A | 12/1995 | Abe |
| 5,749,000 A * | 5/1998 | Narisawa ...................... 396/121 |
| 7,995,909 B2 * | 8/2011 | Ilya et al. ......................... 396/95 |
| 2008/0080739 A1* | 4/2008 | Muramatsu ................... 382/103 |
| 2010/0239239 A1 | 9/2010 | Lee et al. |

FOREIGN PATENT DOCUMENTS

| | | |
|---|---|---|
| JP | 08-251474 A | 9/1996 |
| JP | 3480591 B2 | 10/2003 |
| KR | 10-2010-0104902 A | 9/2010 |

* cited by examiner

*Primary Examiner* — Minh Phan
(74) *Attorney, Agent, or Firm* — Jefferson IP Law, LLP (57) ABSTRACT

A method of continuous auto focusing a camera in a portable terminal is provided. The method includes setting an arbitrary area of a preview screen as a focus area, the preview screen being divided into at least one tracking area, focusing on a subject located within the focus area and fixing a focus of the subject, and adjusting the focus with respect to the focus area when a movement of the subject is detected within the tracking area that includes the focus area.

18 Claims, 6 Drawing Sheets

METHOD AND APPARATUS FOR CONTINUOUS AUTO FOCUSING OF A CAMERA IN A MOBILE TERMINAL

PRIORITY

This application claims the benefit under 35 U.S.C. §119(a) of a Korean patent application filed on Nov. 11, 2010 in the Korean Intellectual Property Office and assigned Serial No. 10-2010-0112183, the entire disclosure of which is hereby incorporated by reference.

BACKGROUND OF THE INVENTION

1. Field of the Invention

The present invention relates to a method and an apparatus for continuous auto focusing of a camera in a portable terminal. More particularly, the present invention relates to a method and an apparatus for continuous auto focusing of a camera in a portable terminal in which a focus is continuously adjusted in consideration of a movement of a subject within a focus area.

2. Description of the Related Art

A portable terminal has recently emerged as a multimedia device that provides various additional services, such as electronic notes, games, and schedulers. In the portable terminal that provides such various additional services, a user interface is essential in order to enhance the ease of use of the additional services.

More particularly, the portable terminal equipped with a high quality and high pixel camera enables users to conveniently capture a photo or video. In such camera or camera application in the portable terminal, a continuous auto focusing, which is one of focus control techniques, can be used.

In a continuous auto focusing method of the related art, a continuous focusing is performed on an object area regardless as to whether movement of the subject occurs. According to the prior art, focusing is unnecessarily carried out when the subject is not moving. Therefore, a motion blur phenomenon or unnecessary current consumption can be caused during the process of focus control.

Thus, there exists a need to develop a method in which a focus of the camera of the portable terminal is efficiently controlled when capturing a photo or video.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for continuous auto focusing of a camera in a portable terminal in which focusing is continuously adjusted in consideration of a movement of a subject that occurs within a focus area.

Another aspect of the present invention is to provide a method and an apparatus for continuous auto focusing of a camera in a portable terminal having a touch screen in which focusing is efficiently performed by using an object tracking technique.

In accordance with an aspect of the present invention, a method of continuous auto focusing a camera in a portable terminal is provided. The method includes setting an arbitrary area of a preview screen as a focus area, the preview screen being divided into at least one tracking area, focusing on a subject located within the focus area and fixing a focus of the subject, and adjusting the focus with respect to the focus area when a movement of the subject is detected within the tracking area that includes the focus area.

In accordance with another aspect of the present invention, an apparatus for continuous auto focusing a camera in a portable terminal is provided. The apparatus includes a display unit for displaying a preview screen, the preview screen being divided into at least one tracking area, and a control unit for setting an arbitrary area of the preview screen as a focus area, for performing focusing on a subject located within the focus area, and for adjusting a focus on the focus area when a movement of the subject is detected within the tracking area that includes the focus area.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In the following description of the exemplary embodiments of the present invention, the term "image" is used to refer at least one of a still image or a video.

FIGS. 1 through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 1:
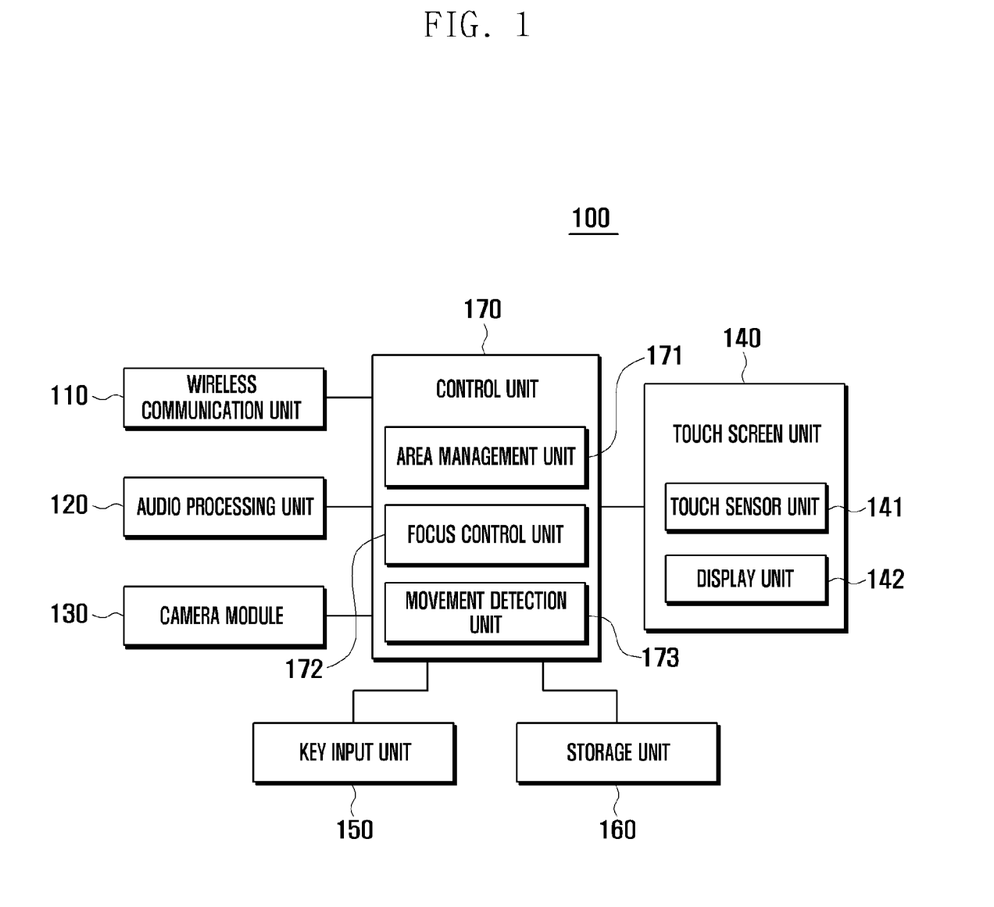
FIG. 1 is a block diagram illustrating an internal configuration of a portable terminal according to an exemplary embodiment of the present invention.

FIG. 1 is a block diagram illustrating an internal configuration of a portable terminal according to an exemplary embodiment of the present invention.

Referring to FIG. 1, a portable terminal 100 includes a wireless communication unit 110, an audio processing unit 120, a camera module 130, a touch screen unit 140, a key input unit 150, a storage unit 160 and a control unit 170.

The wireless communication unit 110 transmits or receives corresponding data to perform wireless communication of the portable terminal 100. The wireless communication unit 110 can include a Radio Frequency (RF) transmitter for performing a frequency up conversion and amplification of a transmission signal and an RF receiver for performing low noise amplification and a frequency down conversion of a received signal. In addition, the wireless communication unit 110 receives data through a wireless channel to be outputted to the control unit 170 and transmits data outputted from the control unit 170 through the wireless channel.

The audio processing unit 120 can include a codec. Furthermore, the codec can include a data codec for processing packet data and an audio codec for processing an audio signal, such as, a voice. The audio processing unit 120 converts a digital audio signal into an analog audio signal by using the audio codec to be reproduced via a speaker (SPK) and converts an analog audio signal inputted through a microphone (MIC) into a digital audio signal by using the audio codec.

The camera module 130 provides an image obtained by photographing the subject. Here, the camera module 130 can be activated to capture the image according to a signal generated from the touch screen unit 140 or the key input unit 150. The camera module 130 can include a camera sensor for converting an optical signal into an electrical signal, an image signal processor for converting an analog video signal into a digital video signal, and a signal processing unit for performing an image processing, such as scaling, noise removal, or a Red, Green, and Blue (RGB) signal conversion on a video signal outputted from the image signal processor such that the video signal is displayed on the touch screen 160. Here, a Charged Coupled Device (CCD) sensor or a Complementary Metal-Oxide Semiconductor (CMOS) sensor can be used for the camera sensor. The signal processing unit may not be configured but implemented by just a Digital Signal Processor (DSP), thereby simplifying the design thereof.

The touch screen unit 140 includes a touch sensor unit 141 and a display unit 142. The touch screen sensor unit 141 detects a touch input of a user. The touch sensor 141 can be a capacitive type, a resistive type, or an infrared type. In addition, the touch sensor 141 can be a pressure sensor and can further include any type of sensor that can detect a contact or pressure occurring thereon. The touch sensor unit 141 detects the touch input from the user and generates a detection signal to be sent to the control unit 170. The detection signal includes coordinate data of the touch input from the user. When a received user input causes a touch position to move, the touch sensor unit 141 generates the detection signal including coordinate data of a travel path of the touch position and transmit the detection signal to the control unit 170.

More particularly, in a photographing mode, the touch sensor unit 131 can detect a user input for setting a focus area or a user input for initiating photographing.

The display unit 142 can include a Liquid Crystal Display (LCD), an Organic Light Emitting Diode (OLED), and an Active Matrix Organic Light Emitting Diode (AMOLED) to visually provide the user with various information, such as, a menu, input data, activated features of the portable terminal 100, and the like. The display unit 142 outputs a booting screen, a standby screen, a menu screen, a screen displayed during a call mode, and a screen displayed during performing other applications.

More particularly, the display unit 142 can provide a preview screen to the user in the photographing mode so that the user may be given a guide to photographing.

The portable terminal 100 can include the touch screen as described above. However, exemplary embodiments of the present invention described herein are not limited to the portable terminal 100 having the touch screen. When an exemplary embodiment of the present invention is applied to the portable terminal that does not have the touch screen, the touch screen unit 140, shown in FIG. 1, can be modified to function only as the display unit 142.

The key input unit 150 receives a key input from a user for controlling the portable terminal 100 and generates an input signal to be sent to the control unit 170. The key input unit 150 can be a keypad that includes a number key and an arrow key. Alternatively, the key input unit 150 can be formed as a predefined function key positioned on a surface of the portable terminal 100. If the portable terminal 100 has the touch screen 140 that manipulates all types of operations of the portable terminal 100, the key input unit 150 can be omitted. If the portable terminal 100 does not have the touch screen unit 140, the key input unit 150 in the photographing mode can receive a user input for setting a focus area or initiating photographing.

The storage unit 160 stores a program and data for operating the portable terminal 100 and may include a program area and a data area. The program area is used to store a program for controlling an overall operation of the portable terminal 100, an Operating System (OS) for booting the mobile terminal 100, an application program for reproducing multimedia contents, and an application program for performing various optional features of the portable terminal 100, such as, a camera feature, a sound reproducing feature, or an image or video reproducing feature. The data area is used to store data generated during the use of the portable terminal 100, for example, an image, a video, a phone book, audio data, and the like.

The control unit 170 controls an overall operation of each element of the portable terminal 100. More particularly, the control unit 170 can control a series of steps for adjusting a focus by considering the movement of the subject within the focus area. To this end, the control unit 170 may further include an area management unit 171, a focus control unit 172, and a movement detection unit 173.

The area management unit 171 divides the preview screen displayed on the display unit 142 into sections of a preset size, when an image capture input command is received. The divided sections, which are used to calculate the movement of the subject, are obtained by dividing a horizontal width of the preview screen by (m) and a vertical height of the preview screen by (n), resulting in a total number 'm×n' of the sections. The number of the sections of the preview screen can vary depending on the specification of the camera module 130. When the number of the sections increases, the size of each section becomes smaller and focusing can be adjusted in response to a small movement of the subject.

Figure 2:
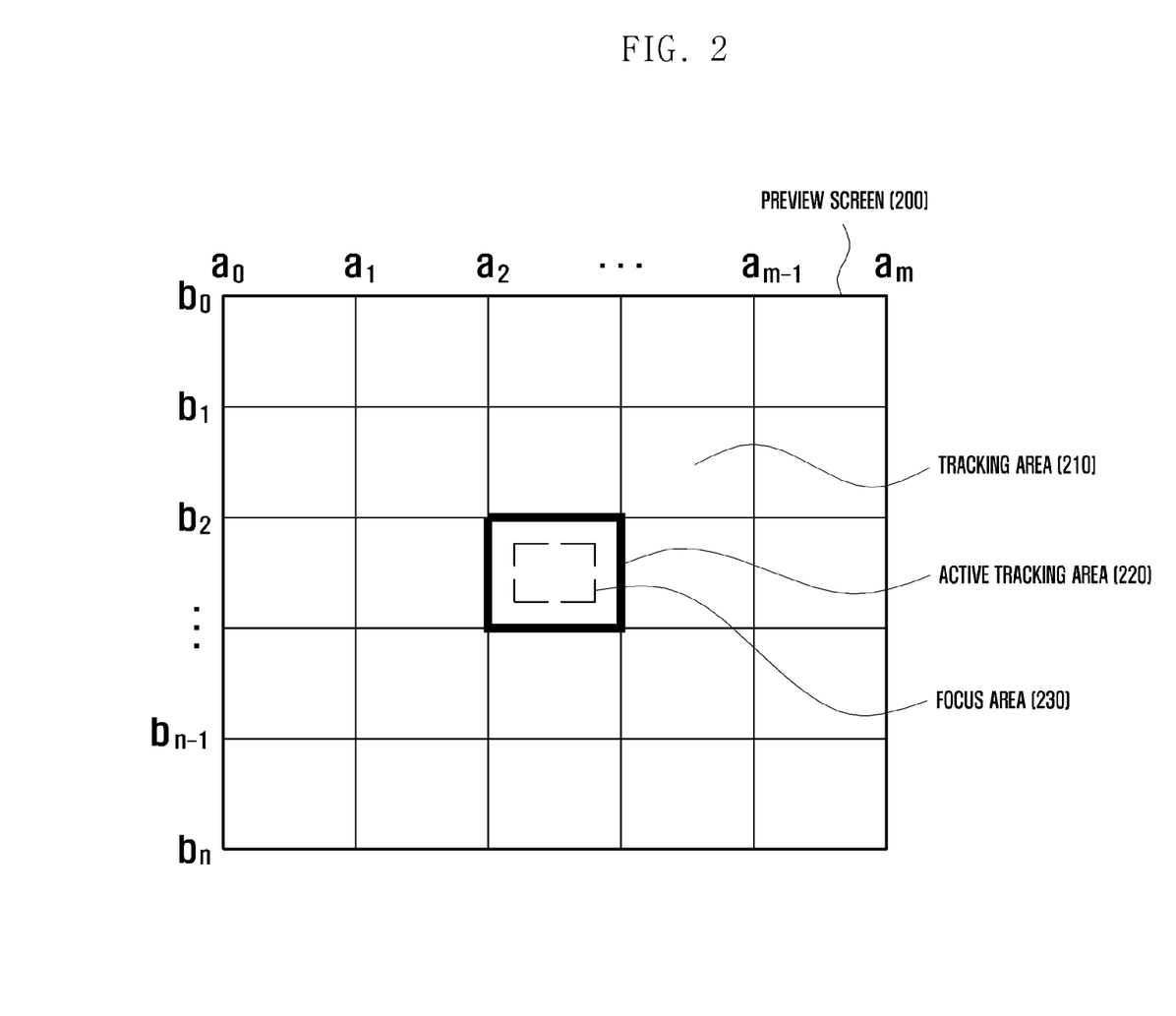
FIG. 2 is a view illustrating a preview screen divided into sections of a preset size according to an exemplary embodiment of the present invention.

FIG. 2 is a view illustrating a preview screen divided into sections of a preset size according to an exemplary embodiment of the present invention.

Referring to FIG. 2, the horizontal width of a preview screen 200 is divided into m (a0, . . . , am) and the vertical length of the preview screen 200 is divided into n (b0, . . . , bn). Each of 'm×n' number of sections is referred to as a tracking area 210. In addition, an area in which the focus on the subject is controlled is referred to as a focus area 230 and the tracking area 210 which includes the focus area 230 is referred to as an active tracking area 220.

The tracking area 210 is determined by an arbitrary division by the area management unit 171 and a user can choose to display or not display the tracking area 210 on the preview screen.

The focus control unit 172 controls the focus of the subject to capture a clear image based on a distance between the camera module 130 and the subject. Here, the area of focusing control can be graphically shown as a circle, a rectangle, or a lattice. Upon receiving an input for selecting the focus area from the user, the focus control unit 172 selects a corresponding area as the focus area. If the input for selecting the focus area is not received from the user, a default area set by the portable terminal 100 is selected as the focus area.

In addition, when a subject movement detection signal is received from the movement detection unit 173 after the focusing is completed, the focus control unit 172 adjusts the focusing on the focus area, wherein the focusing can be adjusted simultaneously. In this manner, unnecessary current consumption by adjusting the focus multiple times can be prevented.

When adjustment of the focusing is completed by the focus control unit 172, the movement detection unit 173 detects whether the movement of the subject occurs within the active tracking area 220. In this case, the movement detection unit 173 can store a reference image for determining whether the movement of the subject occurs and can detect the movement of the subject when the current image data is different from the reference image. When the movement of the subject occurs, a movement detection signal is generated and outputted to the focus control unit 172. Upon receiving the movement detection signal, the focus control unit 172 adjusts the focusing on the focus area.

In this manner, when the focusing is completed, the active tracking area 220 having a size of '1/(m×n) of a total size of the preview screen' needs to be monitored, instead of an entire area of the preview screen to detect the movement of the subject. It is because it can be easily determined whether the focus needs to be adjusted based on a change in the positioning of the subject located proximate to the focus area. Therefore, it can be decided whether the focusing needs to be adjusted using much smaller amount of computation, compared to the prior art in which the movement of the subject is determined based on monitoring the entire area of the preview screen.

It is described above that the control unit 170 includes the area management unit 171, the focus control unit 172, and the movement detection unit 173, each element performing a particular function. However, it is given as an illustrative purpose, and thus, the particular function may not necessarily be assigned to each element. For example, the control unit 170 can perform the particular function of each element.

Figure 3:
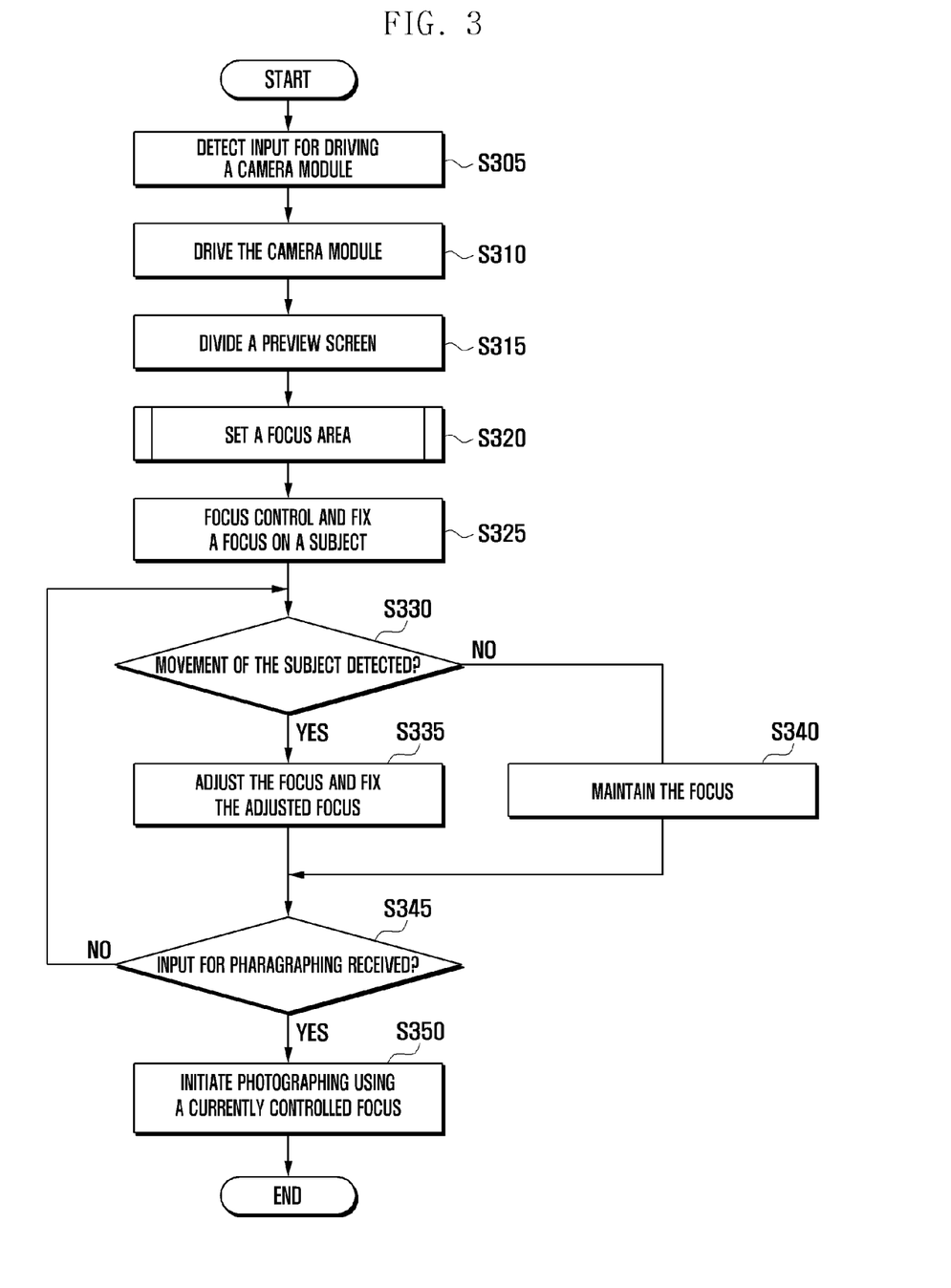
FIG. 3 is a flowchart illustrating a focus control method of a portable terminal according to an exemplary embodiment of the present invention.

FIG. 3 is a flowchart illustrating a focus control method of a portable terminal according to an exemplary embodiment of the present invention.

Referring to FIG. 3, the control unit 170 detects a user input for driving the camera module 130 in step S305. Accordingly, the control unit 170 drives the camera module 130 to display the preview screen in step S310. In step S315, the control unit 170 divides the preview screen displayed on the display unit 142 into sections of a preset size. Here, the control unit 170 divides the preview screen into 'm×n' number of sections by dividing the width of the preview screen by (m) and the height of the preview screen by (n). As described above, each of the 'm×n' number of the sections can be defined as the tracking area 210 and the tracking area including the focus area 230 can be defined as the active tracking area 220.

In step S320, the control unit 170 proceeds to perform steps for setting the focus area. Detailed steps of step S320 for setting the focus area by the control unit 170 are described with reference to FIG. 4.

Figure 4:
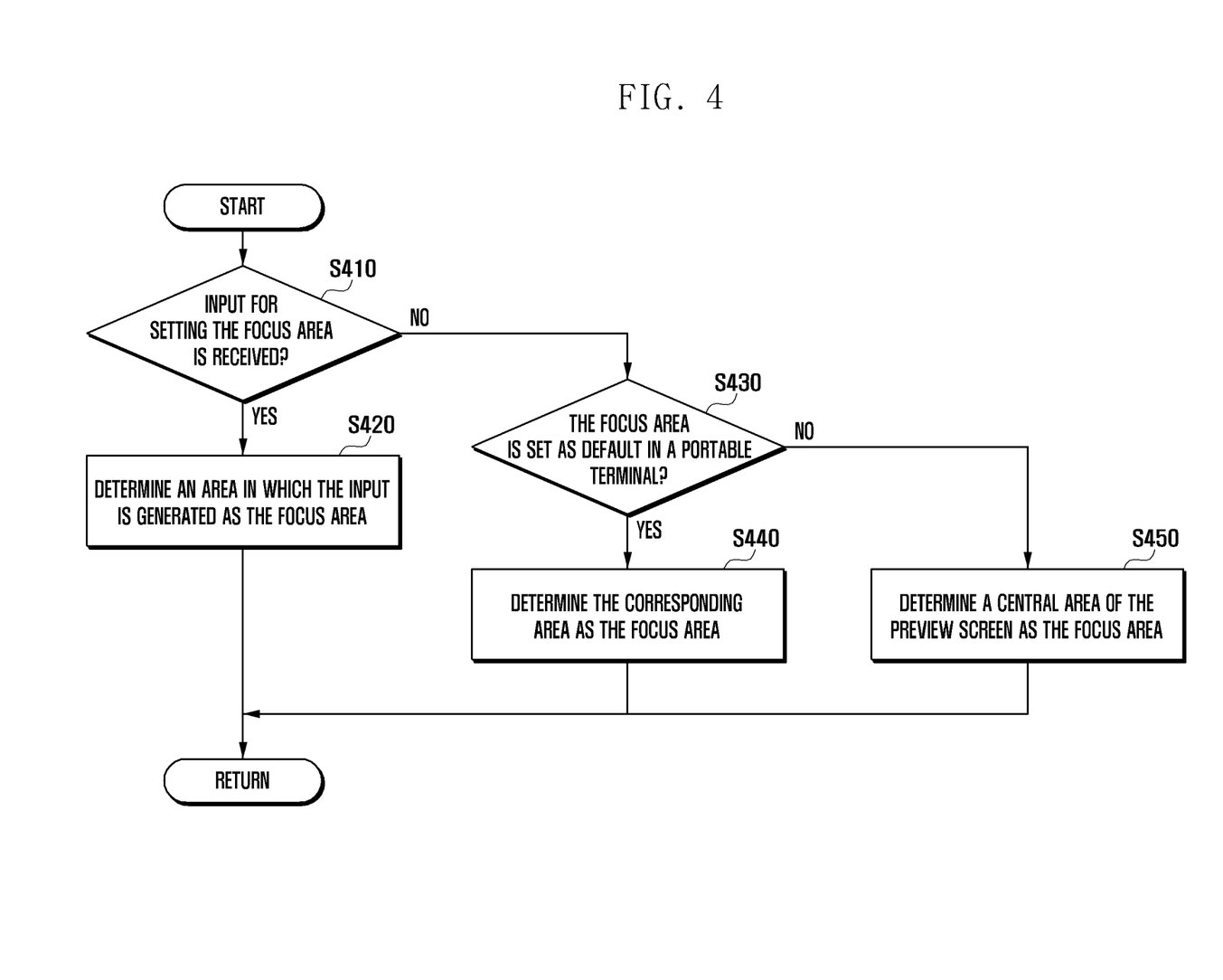
FIG. 4 is a flowchart illustrating a focus area setting method according to an exemplary embodiment of the present invention.

FIG. 4 is a flowchart illustrating a focus area setting method according to an exemplary embodiment of the present invention.

Referring to FIG. 4, the control unit 170 determines whether an input for setting the focus area is received from the user in step S410. When the portable terminal 100 includes the touch screen 140, the input can be a touch input. Alternatively, when the portable terminal 100 does not include the touch screen 140, the input can be a key input.

If it is determined in step S410 that the input for setting the focus area is received, the control unit 170 proceeds to step S420 to set an area in which the input is generated as the focus area 230. In contrast, if it is determined in step S410 that the input for setting the focus area is not received, the control unit 170 proceeds to step S430 to determine whether the focus area 230 is set by default in the portable terminal 100. Here, the default focus area 230 can be any of the tracking area 210, i.e., the divided section of the preview screen.

If it is determined in step S430 that the focus area is set by default, the control unit 170 proceeds to step S440 to set a corresponding area as the focus area. In contrast, if it is determined in step S430 that the focus area 230 is not set by default, the control unit 170 proceeds to step S450 to set a central area of the preview screen as the focus area.

In this manner, the focus area 230 is set and the tracking area including the focus area is set as the active tracking area 220. As described hereafter, the focus area 230 serves as a criteria for determining whether the focusing needs to be adjusted and the active tracking area 220 serves as a criteria for determining whether the movement of the subject is detected.

Referring back to FIG. 3, the control unit 170 proceeds to step S325 after setting the focus area to perform focusing on the detected subject. When the focusing is completed, the focus is fixed.

In step S330, the control unit 170 determines whether the movement of the subject within the active tracking area 220 is detected. As described above, after the focusing is completed, the movement of the subject is monitored with respect to the active tracking area 220 having the size of '1/(m×n) of a total size of the preview screen', instead of monitoring the entire area of the preview screen. Therefore, it can be decided whether the focusing needs to be adjusted using much smaller amount of computation, compared to the prior art in which the movement of the subject is determined based on monitoring the entire area of the preview screen.

Here, the subject can move within or outside the active tracking area 220. Detailed illustrations of the movement of the subject are given in FIGS. 5 and 6.

Figure 5:
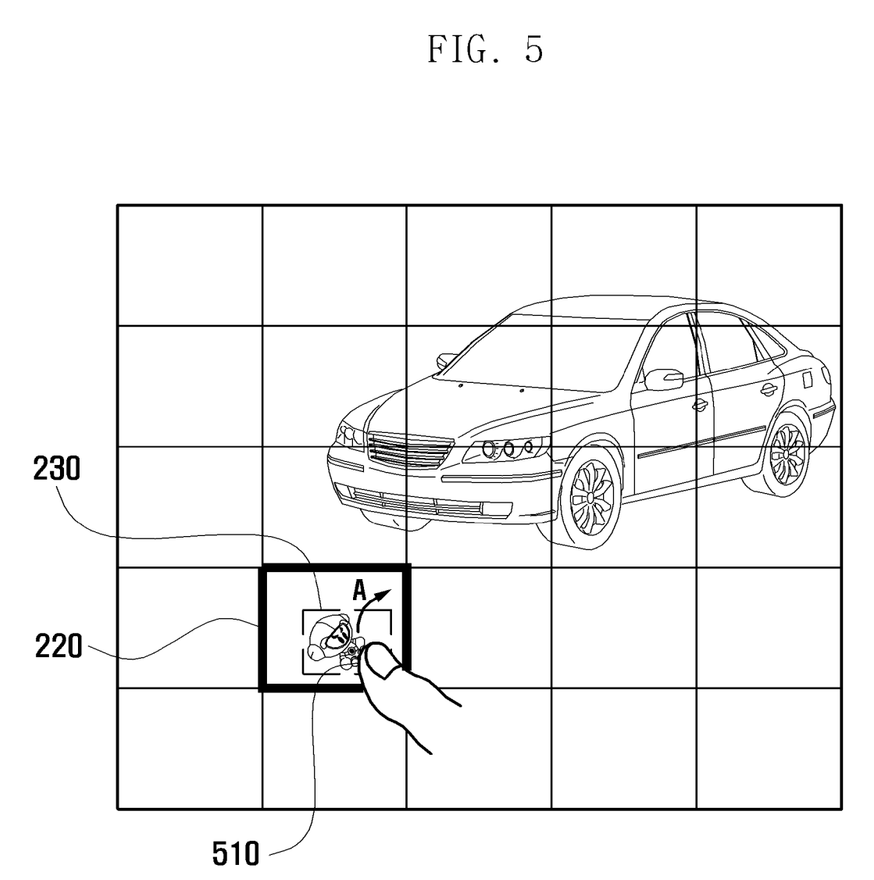
FIG. 5 is a view illustrating a case A where a subject moves within an active tracking area when focusing on the subject in a focus area is completed according to an exemplary embodiment of the present invention.
Figure 6:
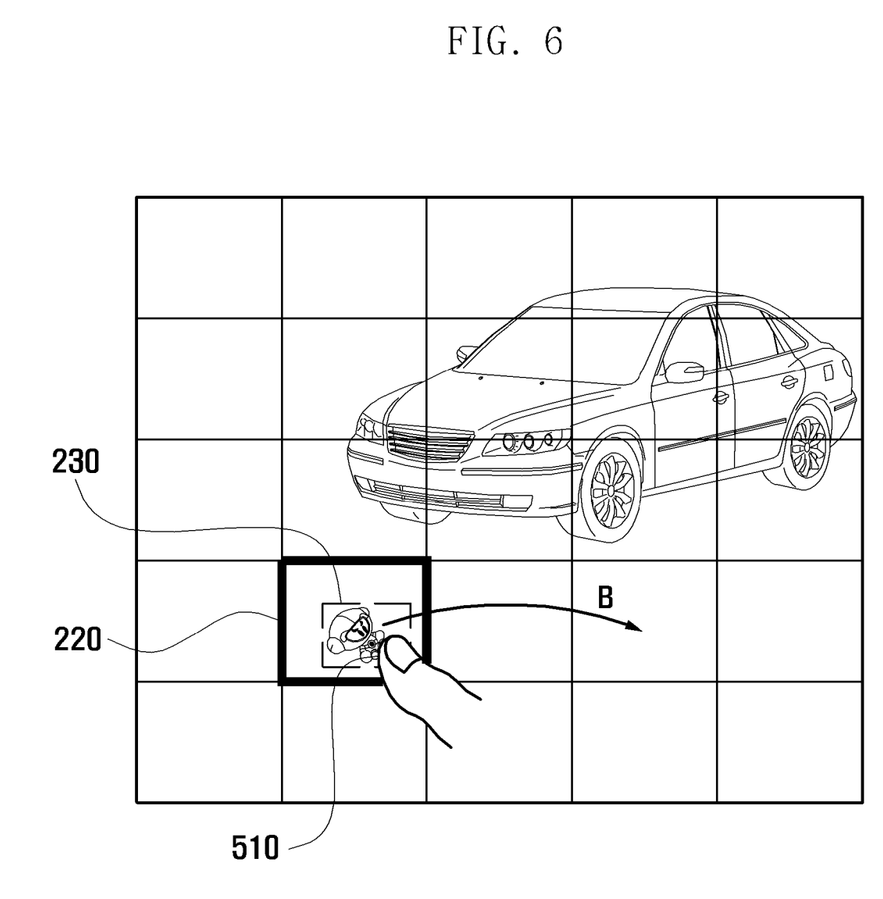
FIG. 6 is a view illustrating a case B where a subject moves outside an active tracking area when focusing on the subject in a focus area is completed according to an exemplary embodiment of the present invention.

FIGS. 5 and 6 are views illustrating a case where a subject positioned in an active tracking area moves within or outside the active tracking area after a focus control is completed, according to exemplary embodiments of the present invention.

Referring to FIG. 5, a case A is illustrated in which the subject moves within the active tracking area 220 when the focusing on the subject 510 within the focus area 230 is completed. When the subject moves within the active tracking area 230 after the focusing on the subject 510 is completed, the control unit 170 performs to adjust the focusing with respect to the focus area 230.

Referring to FIG. 6, a case B is illustrated in which the subject moves outside the active tracking area 220 when the focusing on the subject 510 within the focus area 230 is completed. When the subject moves outwardly from the active tracking area 220 after the focusing on the subject 510 is completed, the control unit 170 does not track the movement of the subject but initiates steps of adjusting the focusing with respect to the focus area 230. Therefore, focusing can be continuously maintained with respect to a particular area.

Referring back to step S330 of FIG. 3, if it is determined in step S330 that the movement of the subject is detected, the control unit 170 proceeds to step S335 to adjust the focusing of the subject with respect to the focus area 230. The control unit 170 fixes the focus when adjustment of the focusing is completed. According to an exemplary embodiment of the present invention, the focusing can be adjusted simultaneously.

In contrast, if it is determined in step S330 that the movement of the subject is not detected, the control unit 170 maintains the focus in step S340.

In step S345, the control unit 170 determines whether an input for initiating photographing is detected. If it is determined in step S345 that the input for initiating photographing is not detected, the control unit 170 returns to step S330 to detect whether the movement of the subject occurs.

In contrast, if it is determined in step S345 that the input for initiating photographing is detected, the control unit 170 proceeds to step S350 to initiate photographing using a currently controlled focus.

In an exemplary implementation of the present invention, if the control unit 170 detects the input for initiating photographing during when the movement of the subject is detected, the focusing is not adjusted and photographing is immediately performed. Alternatively, in another exemplary implementation of the present invention, if the input for setting the focus area is received from the user and the input for initiating photographing is detected during when the focusing is being performed, the control unit 170 initiates photographing after the focusing is completed.

According to an exemplary embodiment of the present invention, focusing of the camera is adjusted in consideration of the movement of the subject only within the focus area, thereby reducing the amount of computation required to determine the movement of the subject. Therefore, focusing speed can be improved while a motion blur phenomenon is prevented. In addition, the movement of the subject outside the focus area is not considered in focusing so that current consumption for performing focus control can be reduced.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method of continuous auto focusing of a camera in a portable terminal, the method comprising:
   setting an arbitrary area of a preview screen as a focus area, the preview screen being divided into at least one tracking area;
   focusing on a subject located within the focus area and fixing a focus of the subject; and
   adjusting the focus with respect to the focus area when a movement of the subject is detected within the tracking area that includes the focus area.

2. The method according to claim 1, further comprising:
   initiating photographing when a user input for photographing is detected.

3. The method according to claim 2, wherein the initiating of the photographing comprises initiating photographing without adjusting the focus when the user input for photographing is received during detection of the movement of the subject.

4. The method according to claim 2, wherein the initiating of the photographing comprises initiating photographing after the focusing on the subject when the user input for photographing is received while the focusing on the subject.

5. The method according to claim 1, wherein, in detecting the movement of the subject, the focus is not adjusted upon the detection of the movement of the subject outside the tracking area that includes the focus area.

6. The method according to claim 1, wherein the setting of the arbitrary area of the preview screen further comprises, when an input for setting the focus area is received from a user, setting an area in which the input is generated as the focus area.

7. The method according to claim 6, wherein the setting of the arbitrary area of the preview screen further comprises, when the input for setting the focus area is not received from the user, setting a preset area as the focus area.

8. The method according to claim 7, wherein the setting of the preset area as the focus area comprises:
   determining whether the input for setting the focus area is received from the user;
   determining whether the focus area is set by default in the portable terminal when the input for setting the focus area is not received from the user;
   setting a corresponding area as the focus area when the focus area is set by default; and setting a central area of the preview screen as the focus area when the focus area is not set by default.

9. The method according to claim 1, wherein the adjusting of the focus further comprises, when the subject is detected to move outside the tracking area that includes the focus area, adjusting the focus with respect to the focus area.

10. An apparatus for continuous auto focusing a camera in a portable terminal, the apparatus comprising:
a display unit for displaying a preview screen, the preview screen being divided into at least one tracking area; and
a control unit for setting an arbitrary area of the preview screen as a focus area, for performing focusing on a subject located within the focus area, and for adjusting a focus on the focus area when a movement of the subject is detected within the tracking area that includes the focus area.

11. The apparatus according to claim 10, wherein the control unit is configured to initiate photographing when a user input for photographing is detected.

12. The apparatus according to claim 11, wherein the control unit is configured to initiate the photographing without adjusting the focus when the user input for photographing is received during detection of the movement of the subject.

13. The apparatus according to claim 11, wherein the control unit is configured to initiate the photographing after the focusing on the subject when the user input for photographing is received while the focusing on the subject.

14. The apparatus according to claim 10, wherein the control unit is configured not to adjust the focus upon the detection of the movement of the subject outside the tracking area that includes the focus area.

15. The apparatus according to claim 10, wherein, when an input for setting the focus area is received from a user, the control unit sets an area in which the input is generated as the focus area.

16. The apparatus according to claim 15, wherein, when the input for setting the focus area is not received from the user, the control unit sets a preset area as the focus area.

17. The apparatus according to claim 16, wherein the setting of the preset area as the focus area comprises:
the control unit determines whether the input for setting the focus area is received from the user;
the control unit determines whether the focus area is set by default in the portable terminal when the input for setting the focus area is not received from the user;
the control unit sets a corresponding area as the focus area when the focus area is set by default; and
the control unit sets a central area of the preview screen as the focus area when the focus area is not set by default.

18. The apparatus according to claim 10, wherein, when the subject is detected to move outside the tracking area that includes the focus area, the control unit adjusts the focus with respect to the focus area.

* * * * *